(No Model.)
C. H. RHETT.
AIR VALVE FOR TRAPS AND WASTE PIPES.
No. 473,961. Patented May 3, 1892.
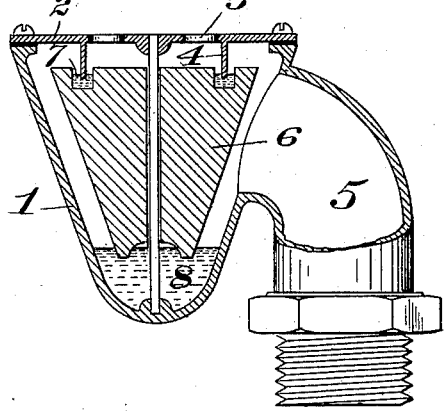
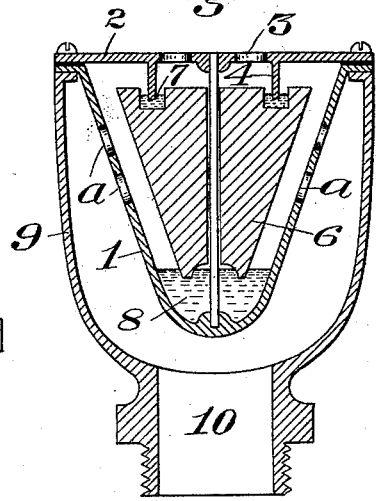
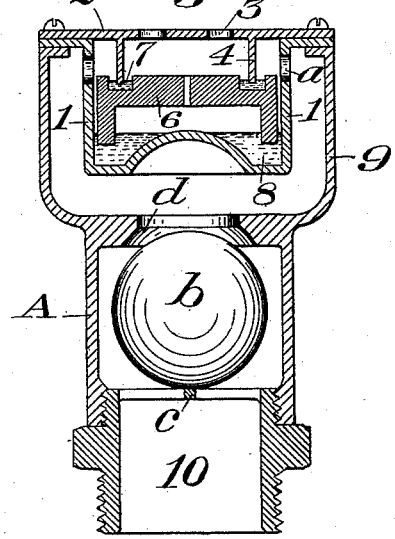
Witnesses
J. K. E. Diffenduffer
E. L. Smith
Inventor
Charles H. Rhett

UNITED STATES PATENT OFFICE.

CHARLES H. RHETT, OF BALTIMORE, MARYLAND.

AIR-VALVE FOR TRAPS AND WASTE-PIPES.

SPECIFICATION forming part of Letters Patent No. 473,961, dated May 3, 1892.

Application filed October 30, 1891. Serial No. 410,375. (No model.)

*To all whom it may concern:*

Be it known that I, CHARLES H. RHETT, of Baltimore, in the State of Maryland, have invented an Improved Siphon-Trap Vent, of which the following is a specification, reference being made to the accompanying drawings, forming a part thereof.

Illustrating the mechanism, Figure 1 is a vertical section of the vent with a side connection. Fig. 2 is the vent with a casing and a central bottom connection. Fig. 3 is a modified form of the vent having the casing, a chamber in the air-pipe, and a valve in the chamber.

The object of the invention is to provide an air-vent to be attached to sewer-traps and pipes which will allow the air to pass into them to prevent the action of siphonage taking place when the discharges of liquid or other causes produce therein a partial vacuum and which is of a novel construction hereinafter more fully described; but the gist of the invention consists in the combination, with the valve, of the mercury pressure on the one hand and the atmospheric pressure on the other to actuate the valve in opposite directions.

In the construction of the vent, Fig. 1 shows the vessel 1 to be cup-shaped, and may be made annular with a closed bottom and preferably rounded. The top has a removable perforated cover 2, with the air-inlets 3 and the valve-seating rim 4, and is large enough for the introduction of a valve. The cover 2 is fastened to the flange on the rim of the vessel by screws. At the side of the vessel 1 is the air-outlet 5, having a screw-nipple and a nut for joining it to a trap or a pipe. The valve 6 may be of wood or of iron or of any suitable material, and is confined within the vessel 1 below the seating and having an annular groove 7 near the outer rim, into which the pendent edge of the seating is dipped by the upward pressure of the valve, forming a close-fitting joint between the valve and the seating. The groove 7 may be partly filled with a liquid, and I prefer mercury, because of its durability and gravity resistance to air-pressure. The valve may have a concave bottom and a hole through the center to traverse a smooth fixed guide; but I do not limit myself to any particular form or material and reserve the right to use it without the annular groove for a liquid or a stem of any kind, relying, when desirable, upon the loose valve, round or otherwise, to operate the device.

In the drawings I have shown two forms of my vessel for holding mercury, but I also use a vessel, which, after due provision of space within for the movement of a loose flat, spherical, or cylindrical valve, has the sides at equidistant periods drawn in concentrically, forming interior vertical projections for guiding its movements with intermediate spaces for receiving the mercury or other liquid when displaced by the downward pressure of the valve.

To carry my invention into effect, I partly charge the vessel 1 with the mercury 8 in an amount sufficient to hold the valve 6 so firmly against the seating 4 that it will resist the ordinary pressure of the external atmosphere, the forces thus brought into operation to actuate the valve in opposite directions being, first, the pressure of the mercury, combined with the contained air of the vessel, to move it upwardly, and, second, the external atmospheric pressure to move it downwardly.

In use, when the vent has been duly attached to a trap or a pipe, the pressure of the valve against the seating forms the seal and shuts in the sewer-air; but when the discharge of liquid through either of them occurs it creates a minus or vacuum pressure within the vessel, withdrawing from the valve the support of the contained air and causing a corresponding pressure of the outer air to equalize it, and which, acting against the valve, overcomes the mercury-pressure, and pushing it downward from the seating admits the air necessary for restoring the equilibrium.

In order to establish a central bottom connection of the vessel to a trap or pipe, as shown by Fig. 2, the hollow casing 9 is constructed open at the top and having a pipe 10 at the bottom and larger than the vessel 1, so that when placed within the casing 9 space remains between the casing 9 and the vessel 1 for air to pass to the central pipe 10, and when this construction is adopted the flange is formed on the rim of the casing 9, and the vessel 1, having the perforations *a* around the sides to give free passage to the air, together with the cover 2, is closely fastened to the flange by screws.

Should it become necessary to connect the vent near to a trap or a pipe discharging liquid, the chamber A, as in Fig. 3, would be formed in the air-outlet 5 and joined to it in any convenient manner, in which is placed the valve $b$ of a gravity less than that of water and preferably supported by the cross-bar $c$, and above in the interior of the chamber A is constructed a valve-seating $d$ for the accommodation of the valve $b$. It will be understood from this construction that if liquid should be forced upward into A the valve $b$ would be floated against the seating $d$ and prevent its entering the vessel 1.

It is evident that with slight mechanical changes my device may be used as a vent for liquid as well as for air, and that the vessel 1 should not be constructed of any material having an active affinity with mercury.

Having described my invention, I claim—

1. In a siphon-trap vent, a liquid-holding vessel having a closed bottom, a perforated cover for admitting air, a valve-seating in the top of the vessel, an air-outlet at the side, a valve below the seating, and a buoyant liquid in the vessel under the valve, whereby the inlet is closed by the valve to prevent the escape of sewer-air or opened for the admission of the external air, according as the pressure of the sewer-air varies, substantially as described.

2. The combination, in a siphon-trap vent, of a cup-shaped vessel closed at the bottom and a perforated cover for admiting air, a valve-seating rim in the top of the vessel, an air-outlet at the side, a valve below the seating, having a concave bottom and an annular groove in the top to hold a liquid, and mercury in the vessel under the valve to actuate the valve, according as the pressure of the sewer-air varies, and a side connection, substantially as described.

3. The combination, in a siphon-trap vent, of a cup-shaped vessel closed at the bottom, with a perforated cover, a valve-seating rim in the top, perforations in the sides, a valve below the seat, with a concave bottom, and a central hole for a fixed guide, and an annular groove in the top to hold mercury, mercury in the vessel under the valve for controlling the valve, according as the pressure of the sewer-air varies, and a hollow casing having a central bottom connection, substantially as described.

4. The combination, in a siphon-trap vent, of an annular cup-shaped vessel closed at the bottom and having a perforated cover, a valve-seating rim in the top, perforations in the sides of the vessel, a valve below the seat, with a concave bottom, and an annular groove in the top, mercury in the vessel under the valve to actuate it according as the pressure of the sewer-air varies, a central bottom connection to the hollow casing, a chamber formed within the air-outlet pipe containing a valve, a cross-bar at the bottom supporting the valve, and above it in the interior of the chamber a valve-seating for the valve, substantially as described.

5. In a siphon-trap vent, the combination, with a vessel containing a liquid and an air-valve, of an air-outlet pipe having a chamber in the pipe and a float valve in the chamber, a seating for the valve in the top of the chamber, a cross-bar at the bottom to prevent the valve obstructing the outlet, the sides of the chamber to guide the valve to the seating, and a trap connection, whereby regurgitation will float the valve against the seating and exclude back-water from the vessel and the valve, substantially as described.

In testimony whereof I have hereunto signed my name.

CHARLES H. RHETT.

Witnesses:
JNO. T. MADDOX,
ALBERT RHETT.